United States Patent [19]
Bujas

[11] 3,928,132
[45] Dec. 23, 1975

[54] ANNULAR FUEL ELEMENT FOR HIGH-TEMPERATURE REACTORS

[75] Inventor: Roko Bujas, Gif-sur-Yvette, France

[73] Assignee: Commissariat a l'Energie Atomique, Paris, France

[22] Filed: Sept. 28, 1973

[21] Appl. No.: 401,960

Related U.S. Application Data

[63] Continuation-in-part of Ser. No. 245,622, April 19, 1972, abandoned.

[30] Foreign Application Priority Data
Apr. 29, 1971  France .............................. 71.15372

[52] U.S. Cl. .................................................. 176/83
[51] Int. Cl. ............................................. G21c 3/06
[58] Field of Search ............... 176/67, 83, 90, 91 R; 252/301.1 R; 264/.05

[56]  References Cited
UNITED STATES PATENTS

| | | | |
|---|---|---|---|
| 3,202,583 | 8/1965 | Salesse et al. | 176/67 |
| 3,298,921 | 1/1967 | Bokros et al. | 176/67 |

*Primary Examiner*—Stephen C. Bentley
*Attorney, Agent, or Firm*—Cameron, Kerkam, Sutton, Stowell & Stowell

[57] ABSTRACT

A compacted fuel element of annular shape is enclosed in a graphite casing constituted by an inner tube and an outer tube. The inner tube is formed of graphite having a lower coefficient of shrinkage than the graphite of the outer tube under irradiation and is of smaller thickness than the outer tube.

2 Claims, 3 Drawing Figures

ANNULAR FUEL ELEMENT FOR HIGH-TEMPERATURE REACTORS

This is a continuation in part application of my application Ser. No. 245,622 filed Apr. 19. 1972, now abandoned, which relates to an annular fuel element for a high-temperature reactor.

High-temperature reactors call for the use of ceramic fuels by reason of their stability at high temperatures and their corrosion resistance: satisfactory fuels which can be mentioned by way of example are $UO_2$, UC, $UC_2$, whether employed alone or in combination with other substances such as the mixture $UO_2$—$ThO_2$, for example.

The fuel is enclosed in a casing which is advantageously of graphite by reason of the fact that graphite has a low neutron-absorption capacity, is a good moderator and possesses good high-temperature strength.

In high-temperature reactors, the fuel element which is in the compacted state frequently assumes an annular shape and its casing is composed of an outer tube and an inner tube, both tubes being cooled by a gas such as helium which circulates in the direction of the axis of the fuel element.

As a result of the necessary allowance on assembly the contact between the compacted fuel element and these two tubes is not ensured and this results in poor transmission of heat between the fuel element and the tubes.

The object of the invention is to overcome this disadvantage by ensuring that the compacted fuel element is brought into contact with the two tubes under irradiation of fast neutrons.

The invention relates to a compacted fuel element for a high-temperature reactor, said fuel element of annular shape being enclosed within an annular graphite casing constituted by an outer graphite tube and an inner graphite tube wherein the inner tube is formed of a graphite having a lower coefficient of shrinkage under irradiation of the fast neutrons produced in the reactor than the graphite of the outer tube.

As disclosed in Reactor Handbook 1960 — Vol. 1 Materials page 895 Interscience publishers, Inc, New-York, it is known that graphites exposed to fast neutrons undergo a dimensional contraction.

By way of example, the graphite of the inner tube can be of the type supplied by Societe Pechiney under the commercial designation FHAN and the graphite of the outer tube is of the baked graphitic type.

A description will now be given with reference to the accompanying drawings.

FIG. 1 is a view in a partially cut away elevation of a fuel element 1 which is annular and enclosed in a graphite casing having an outer tube 2 and an inner tube 3.

Figure 1:
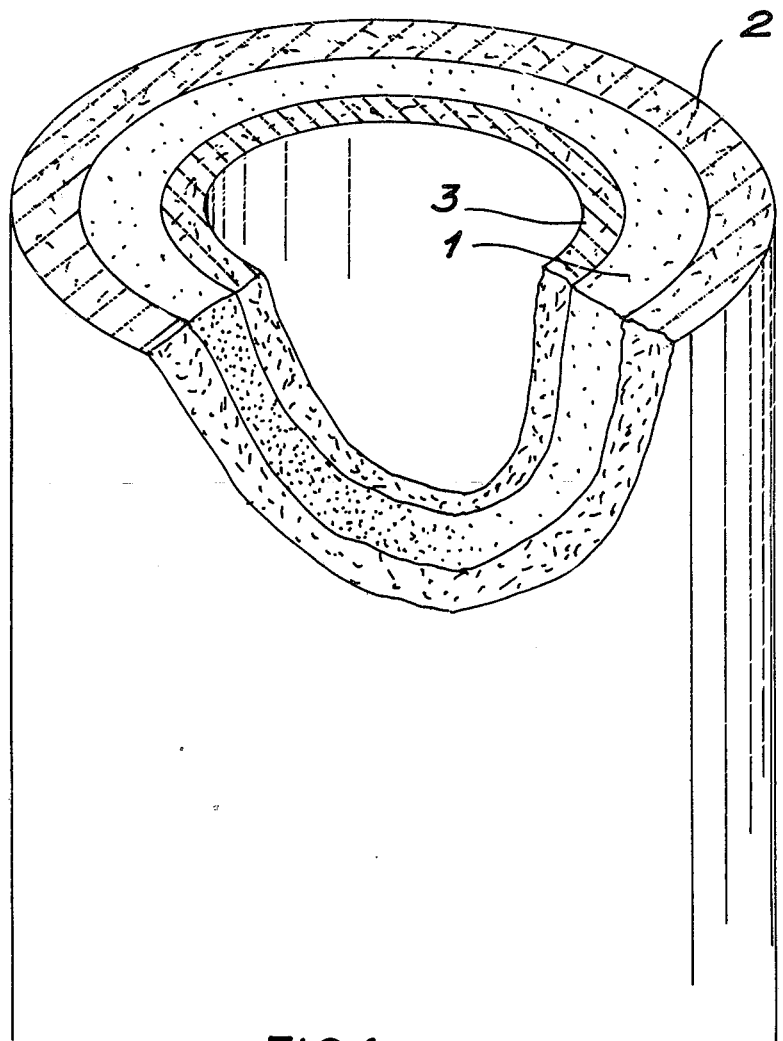
Figure 2:
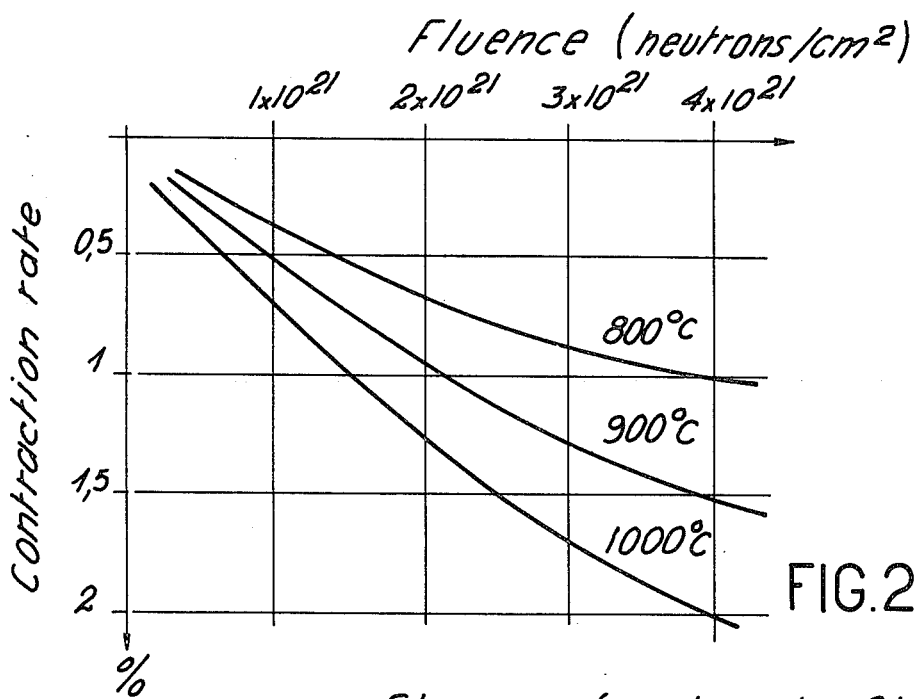
FIG. 2 is a curve showing the contraction rate of a graphite used in inner tube.
Figure 3:
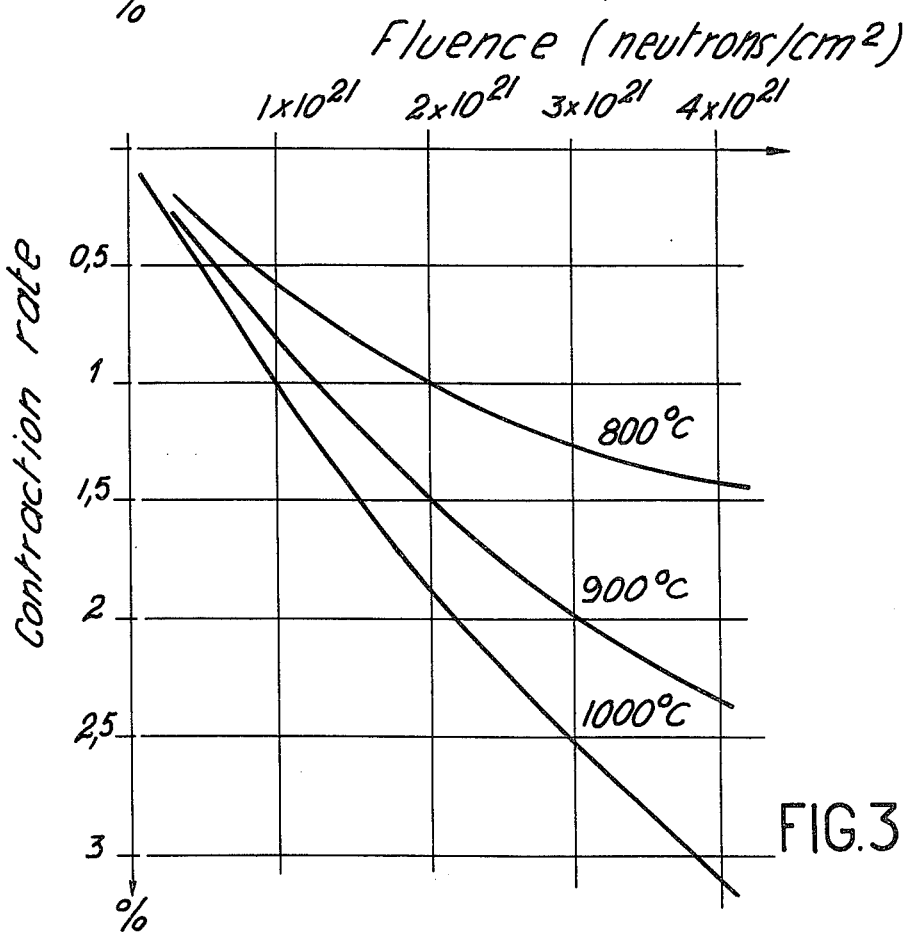
FIG. 3 is a curve showing the contraction rate of a graphite used in outer tube.

In a preferred embodiment of the invention, the outer tube is given a greater thickness than that of the inner tube. In fact, the outer tube is subjected to tensile stress whereas the inner tube works under compressive stress and the strength of graphite is much lower in tension than in compression.

What I claim is:

1. A compacted fuel element for a high-temperature reactor, said fuel element of annular shape being enclosed within an annular graphite casing constituted by an outer graphite tube and an inner graphite tube, wherein the inner tube is formed of a graphite having a lower coefficient of shrinkage under irradiation of the fast neutrons produced in the reactor than the graphite of the outer tube.

2. A fuel element according to claim 1, wherein the outer tube has a greater thickness than the inner tube.

* * * * *